(12) United States Patent
Lukas et al.

(10) Patent No.: US 9,379,536 B2
(45) Date of Patent: Jun. 28, 2016

(54) CONTROL MEANS FOR AN ELECTRICALLY ADJUSTABLE PIECE OF FURNITURE

(75) Inventors: Stefan Lukas, Preding (AT); Mario Schenk, Bad Gams (AT)

(73) Assignee: LOGICDATA ELECTRONIC & SOFTWARE ENTWICKLUNGS GMBH, Deutschlandsberg (AT)

( * ) Notice: Subject to any disclaimer, the term of this patent is extended or adjusted under 35 U.S.C. 154(b) by 339 days.

(21) Appl. No.: 14/342,528

(22) PCT Filed: Aug. 29, 2012

(86) PCT No.: PCT/EP2012/066763
§ 371 (c)(1),
(2), (4) Date: May 30, 2014

(87) PCT Pub. No.: WO2013/034475
PCT Pub. Date: Mar. 14, 2013

(65) Prior Publication Data
US 2014/0321004 A1    Oct. 30, 2014

(30) Foreign Application Priority Data

Sep. 8, 2011  (DE) .......................... 10 2011 113 933

(51) Int. Cl.
| | |
|---|---|
| *H02H 9/00* | (2006.01) |
| *H02H 7/20* | (2006.01) |
| *A61G 7/018* | (2006.01) |
| *G05B 19/042* | (2006.01) |

(Continued)

(52) U.S. Cl.
CPC ................. *H02H 7/20* (2013.01); *A61G 7/018* (2013.01); *G05B 19/0428* (2013.01); *G05B 2219/23316* (2013.01); *H02J 9/061* (2013.01); *H02M 2001/0032* (2013.01); *Y02B 70/16* (2013.01); *Y02B 70/3241* (2013.01); *Y04S 20/227* (2013.01)

(58) Field of Classification Search
USPC ............................................. 361/18
See application file for complete search history.

(56) References Cited

U.S. PATENT DOCUMENTS

| | | | | |
|---|---|---|---|---|
| 8,638,083 | B2 * | 1/2014 | Koch | ............................ 323/288 |
| 2008/0117653 | A1 | 5/2008 | Saito | |

(Continued)

FOREIGN PATENT DOCUMENTS

| | | |
|---|---|---|
| DE | 4404131 A1 | 9/1995 |
| DE | 19943124 A1 | 3/2001 |

(Continued)

*Primary Examiner* — Ronald W Leja
(74) *Attorney, Agent, or Firm* — McDermott Will & Emery LLP

(57) ABSTRACT

A control means comprises a control segment (3) that is designed for driving an electrically adjustable piece of furniture and a switched-mode power supply unit (2) that supplies power to the control segment (3). The switched-mode power supply unit (2) features a switching regulator component (223) for controlling the switched-mode power supply unit and can be switched into a normal operating mode and into an idle mode. The switched-mode power supply unit (2) is designed for making available a supply voltage for the switching regulator component (223) in a clocked fashion with the aid of a start-up circuit (224) in the idle mode. The switched-mode power supply unit (2) features a power failure detection circuit (230) that is designed for detecting a failure of a line voltage applied to the input side of the switched-mode power supply unit (2) based on a signal within the start-up circuit (224) and for signaling this failure to the control segment (3).

9 Claims, 3 Drawing Sheets

(51) Int. Cl.
*H02M 1/00* (2006.01)
*H02J 9/06* (2006.01)

(56) References Cited

U.S. PATENT DOCUMENTS

2009/0268488 A1 10/2009 Fujii
2011/0228576 A1 9/2011 Koch
2012/0033449 A1 2/2012 Koch et al.
2014/0321004 A1* 10/2014 Lukas .................... A61G 7/018
361/18

FOREIGN PATENT DOCUMENTS

DE 102008051247 A1 4/2010
DE 102008056914 A1 5/2010

* cited by examiner

CONTROL MEANS FOR AN ELECTRICALLY ADJUSTABLE PIECE OF FURNITURE

The invention pertains to a control means with a control segment that is designed for driving an electrically adjustable piece of furniture and with a switched-mode power supply unit.

Electrically adjustable pieces of furniture are increasingly advertised. For example, the tabletop height of many tables, particularly desks, can be electrically adjusted by means of a special drive. On certain beds such as, for example, comfort beds or hospital beds, the height or the angle of inclination of the bed can also be adjusted by means of electric drives.

In this case, it is possible to utilize D.C. motors that are operated with a low voltage for the drive of the electric adjusting device. For this purpose, the line voltage is reduced to the lower voltage range of the D.C. motors, for example, by means of a switched-mode power supply unit. The drive of the D.C. motors is realized in an assigned control means by connecting the motors to the D.C. voltage in a controlled fashion.

Another option for a drive of an electrically adjustable piece of furniture consists of utilizing one or more A.C. motors, for which a control means is likewise provided. In this case, the A.C. line voltage can be stepped down to a lower A.C. voltage range for the control means in order to connect the A.C. motors to the stepped-down A.C. voltage in a controlled fashion. Alternatively, an A.C. voltage for driving the A.C. motors can be derived from a D.C. voltage that is made available by a switched-mode power supply unit.

In order to minimize the power dissipation in the switched-mode power supply unit of such a control means, it may be desirable to operate the switched-mode power supply unit either in a normal operating mode, in which a voltage is required for the control means, or in an idle mode, in which the switched-mode power supply unit delivers no power or only a negligible power compared to the normal operation. In order to allow a fast change-over from the idle mode into the normal operating mode, a power supply of relevant assemblies is realized, for example, by means of a start-up circuit that makes available the energy required for starting up the switched-mode operation.

If the line voltage fails during the operation of the control means, the operation of the control means usually ends, at the latest, when the energy stored in buffer capacitors is consumed. When such a line voltage failure occurs, it is therefore desirable to detect this failure as early as possible and, for example, to stop motors that are still running in an orderly fashion, as well as to store operational data. In a conventional power supply unit with a transformer, a signal for the detection of a line voltage failure can be generated, for example, on the transformer windings. This is not possible in a conventional switched-mode power supply unit without a transformer.

An objective to be attained therefore can be seen in making available a control means for an electrically adjustable piece of furniture that features a switched-mode power supply unit and allows an efficient detection of a power failure.

This objective is attained with the subject matter of the independent claim. Embodiments and enhancements of the invention form the subject matter of the dependent claims.

For example, a switched-mode power supply unit of a control means for an electrically adjustable piece of furniture features a start-up circuit that supplies power to a switching regulator component of the switched-mode power supply unit in an idle mode. The switched-mode power supply unit furthermore features a power failure detection circuit that is capable of monitoring if a line voltage applied to the input side of the switched-mode power supply unit fails based on a signal in the start-up circuit. The status of the line voltage can be signaled to the control segment such that it can stop any motors of the electrically adjustable piece of furniture that may still be running in an orderly fashion and store current operational data, as well as a corresponding motor position of a stopped motor. In this way, the operation of the control means can continue from defined states once the line voltage is available again. Due to the monitoring of the line voltage based on a signal in the start-up circuit, the power demand for the monitoring is minimized and it is furthermore possible to directly detect a line voltage failure. In this way, the energy stored, for example, in buffer capacitors of the switched-mode power supply unit can be utilized more efficiently and therefore longer.

For example, one embodiment of a control means comprises a control segment that is designed for driving an electrically adjustable piece of furniture and a switched-mode power supply unit that supplies power to the control segment. The switched-mode power supply unit features a switching regulator component for controlling the switched-mode power supply unit and can be switched into a normal operating mode and into an idle mode. The switched-mode power supply unit is furthermore designed for making available a supply voltage for the switching regulator component in a clocked fashion with the aid of a start-up circuit in the idle mode. The switched-mode power supply unit features a power failure detection circuit that is designed for detecting a failure of the line voltage applied to the input side of the switched-mode power supply unit based on a signal in the start-up circuit and for signaling this failure to the control segment.

Due to the utilization of a signal such as, for example, a voltage or a current in the start-up circuit for respectively monitoring the line voltage or detecting a line voltage failure, the power demand is only slightly increased by the line voltage failure detection, particularly in comparison to a line voltage failure detection that is structured independently of a start-up circuit.

For example, the switched-mode power supply unit can be switched into an idle mode with the aid of a ready signal. In this way, the average power demand of the control means, particularly of the switched-mode power supply unit, can be reduced. Among other things, this lowers the operating costs of the control means. However, the switched-mode power supply unit can also be designed for a lower continuous power such that the manufacturing effort and the costs of the switched-mode power supply unit are reduced. The ready signal is especially realized in the form of a logic signal.

The control segment and the switched-mode power supply unit are preferably integrated into a common housing of the control means. The integration of the control segment and the switched-mode power supply unit into a common housing of the control means makes it possible, among other things, to save material costs. For example, a switched-mode power supply unit, the power of which is approximately adapted to the demand of the control means, can be realized smaller than a corresponding transformer with comparable power. Accordingly, the housing of the control means that also accommodates the switched-mode power supply unit can be realized smaller than in conventional solutions. Such a housing can therefore also be arranged on an adjustable piece of furniture with less effort and in a superior fashion with respect to visual considerations.

The switched-mode power supply unit is preferably designed for delivering a D.C. voltage that can be utilized by the control segment for generating at least one output voltage of the control means. The output voltage of the control means is usually fed to one or more electric motors that may either be realized in the form of D.C. motors or A.C. motors.

In one embodiment, the switched-mode power supply unit features a first and a second stage, wherein the first stage is designed for generating an intermediate voltage from a line voltage applied to the input side of the switched-mode power supply unit. The second stage is accordingly designed for generating the D.C. voltage from the intermediate voltage during the switched-mode operation. For this purpose, the second stage comprises, for example, a switching regulator.

The switched-mode power supply unit can be operated in a normal operating mode and in an idle mode. In the normal operating mode, the switched-mode power supply unit delivers a supply voltage for the control segment. In the idle mode, only a voltage with a low load capacity or no voltage at all is delivered by the switched-mode power supply unit. For example, the start-up circuit is designed for deriving the supply voltage for the switching regulator component from the line voltage.

In the idle mode, a control of switching processes is consequently deactivated in the second stage such that the occurrence of power dissipation due to unnecessary switching processes is minimized when no D.C. output voltage is required. Due to the clocked supply of power to the switching regulator component, however, the switched-mode power supply unit is in a state that allows a fast change-over into the normal operating mode, in which corresponding power is made available at the output of the switched-mode power supply unit.

In one embodiment example, the start-up circuit features an energy storage, a resistor element and a detection element that is connected in series to the resistor element and forms part of a power failure detection circuit. During an operation of the switching regulator component in the idle mode, the voltage supply of the switching regulator component is realized by means of the energy storage, for example a capacitor. This energy storage is charged by means of the resistor element that is preferably chosen with a high resistance, wherein a certain charging current results due to a resistance value of the resistor element. Since the detection element is connected in series to the resistor element, it can be determined whether a sufficient line voltage is present, for example, based on the current. For example, a power supply of the start-up circuit is realized with the line voltage. The resistor is connected, for example, to a line voltage terminal while the energy storage is connected to an intermediate voltage terminal. In this way, for example, a diode of a rectifier is utilized in the first stage for a half-wave rectification that, among other things, delivers the charging current. Accordingly, the charging current of the energy storage is simultaneously utilized for monitoring the line voltage such that no additional current branches are required for monitoring the line voltage. This additionally contributes to the low power demand of the power failure detection circuit.

For example, the detection element comprises a light-emitting diode that forms part of an optocoupler, wherein said optocoupler couples the power failure detection circuit to the control segment. In the presence of a charging current, for example, the light-emitting diode emits corresponding radiation that is picked up by an associated phototransistor of the optocoupler. The phototransistor is electrically connected, for example, to the control segment, particularly to a processor or microcontroller of the control segment that evaluates the detection signal of the light-emitting diode or the phototransistor. An electrically isolated coupling between the switched-mode power supply unit and the control segment is furthermore produced by the optocoupler.

In a special embodiment, the energy storage and the resistor element of the start-up circuit are dimensioned in such a way that a time period for charging the energy storage is in the idle mode longer than a time period for discharging the energy storage by the switching regulator component. As described above, a certain charging current results due to a certain resistance value of the resistor element. The current that is respectively required during the operation or the initialization of the switching regulator component and drawn from the energy storage is higher than the charging current in this embodiment such that the energy storage is discharged faster than it is charged with the intermediate voltage by the resistor element.

The charging and discharging of the energy storage results in a clocked operation of the switching regulator component.

In another embodiment, the start-up circuit features a detection circuit that is designed for controlling a connection between the start-up circuit and the switching regulator component based on a voltage across the energy storage. For example, the switching regulator component should only be supplied with the energy stored in the start-up circuit once the voltage across the energy storage is sufficient for the operation of the switching regulator component. For example, the switching regulator component is only active above a certain threshold voltage, wherein a parasitic current may also flow through the switching regulator component and be needlessly lost below this threshold voltage. Due to the voltage-dependent connection of the switching regulator component to the start-up circuit, the occurrence of an unused parasitic current in the switching regulator component is prevented. This improves the efficiency of the control means, in particular, due to the reduced power dissipation of the control means in the idle mode or in a standby mode.

For example, the detection circuit is designed for producing the connection between the start-up circuit and the switching regulator component when the voltage across the energy storage exceeds a first and, in particular, higher threshold value and for separating the connection between the start-up circuit and the switching regulator component when the voltage across the energy storage falls short of a second and, in particular, lower threshold value. The first threshold value preferably is higher than the threshold voltage at which the switching regulator component becomes active. The second threshold value can be chosen, for example, below this threshold voltage such that a connection between the start-up circuit and the switching regulator component is separated after the switching regulator component transfers into an inactive mode as a result of the consumption of the stored energy.

Due to the comparison with a first and a second threshold value, a hysteresis curve that allows an efficient utilization of the energy stored in the start-up circuit can be realized.

In different embodiments, the control segment is designed for stopping connected motors of the electrically adjustable piece of furniture when a failure of the line voltage is signaled by the power failure detection circuit and for storing current operational data, particularly one or more motor positions.

A control of the type described in the different embodiments can be used for any electrically adjustable piece of furniture such as, for example, height-adjustable tables, beds, particularly hospital beds, or the like. Due to the low power consumption, particularly in the idle mode in which no adjustment of the piece of furniture takes place, the control means can also be easily integrated. This is also a consequence, among other things, of the reduced heat development due to the lower power dissipation in the idle mode.

Embodiment examples of the invention are described in greater detail below with reference to the figures. In this context, elements with respectively identical function or operation are identified by the same reference symbols.

Figure 1:
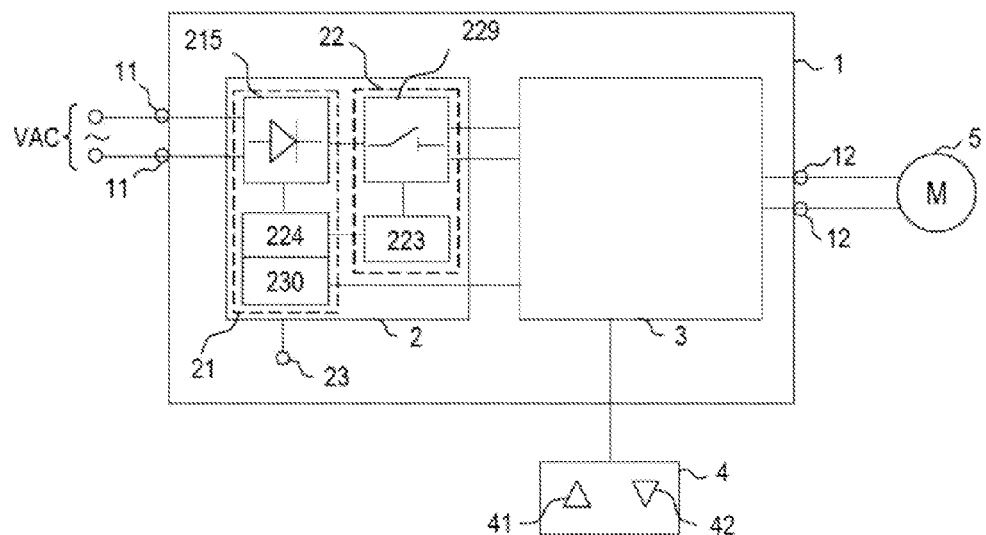
FIG. 1 shows an embodiment example of a control means.

FIG. 1 shows an embodiment example of a control means for an electrically adjustable piece of furniture. The control means comprises a housing 1, in which a switched-mode power supply unit 2 and a control segment 3 are provided. On its input side, the switched-mode power supply unit 2 is connected to a line terminal VAC by means of input terminals 11. The output side of the switched-mode power supply unit 2 is connected to the control segment 3, the output of which is coupled to the output terminal 12 of the housing 1. The switched-mode power supply unit 2 features a control input 23, to which a ready signal for the controlled transfer into an idle state can be fed. In different embodiments, the ready signal can be made available by the control segment 3 and/or generated in the switched-mode power supply unit 2 itself and/or externally supplied. In this embodiment, a motor 5 that can cause an adjustment of the adjustable piece of furniture is connected to the output terminals 12. An operating component 4 that features operating elements 41, 42 is furthermore connected to the control segment 3.

The switched-mode power supply unit 2 comprises a first stage 21 and a second stage 22. Among other things, a rectifier block 215 that generates an intermediate voltage from the line voltage applied to the input side is provided in the first stage 21. The first stage 21 furthermore comprises a start-up circuit 224, the input side of which is connected to terminals of the rectifier block 215. A power failure detection circuit 230 is arranged on the start-up circuit 224, wherein said power failure detection circuit evaluates a signal in the start-up circuit 224 and delivers a corresponding evaluation result to the control segment 3. The output side of the start-up circuit 224 is connected to a switching regulator component 223 in the second stage 22 that controls switching means 229 in the second stage 22. The second stage 22 is suitable, in particular, for generating a D.C. voltage for the control segment 3 from the intermediate voltage delivered by the first stage 21 during the switched-mode operation.

The switched-mode power supply unit 2 makes it possible to convert an A.C. line voltage applied to the line terminal VAC into a usually low D.C. voltage that can be used by the control segment 3 for driving the motor 5. Although only one motor 5 is illustrated in this embodiment example, it would naturally also be possible to drive several motors jointly or independently of one another by means of the control segment 3. The operation of the control means is realized, for example, with the aid of the operating elements 41, 42 that cause the control segment 3 to drive the motor 5.

The input terminal 11 of the housing 1 is realized, for example, in the form of a conventional power receptacle for conventional power cords. However, it would alternatively also be possible to provide a permanently installed cable for connection to the line terminal VAC. Similarly, the motor or the motors can be connected to the control segment 3 by means of a permanently connected cable or alternatively by means of an output terminal 12 in the form of a special motor terminal.

The operating component 4 is realized in the form of a separate assembly that is connected to the control segment 3 by means of an operating cable in this embodiment example, but in other embodiment examples may also be directly integrated into the housing 1 or mechanically connected to the housing 1 in such a way that the operating component 4 and the housing 1 form an integrated unit.

A switched-mode power supply unit 2 according to the present embodiment example has a smaller structural size than a transformer with a conventional design for a corresponding electrical power. Consequently, the control means with the switched-mode power supply unit 2 and the control segment 3 can be installed in a space-saving fashion in a smaller housing 1 than that of conventional transformers. Such a control means therefore can also be mounted on an adjustable piece of furniture with a reduced installation effort and lower production costs. In this case, the control means can be arranged, in particular, at ergonomically and/or visually favorable locations of the adjustable piece of furniture.

The size of the switched-mode power supply unit and therefore the size of the entire control means or of the housing 1 of the control means not only depends on the required maximum electrical power of the control means, but also on a time component, particularly a ratio between empirical values for a load condition and idle phases between load conditions. For example, a switched-mode power supply unit is designed for a load condition of one minute and a subsequent idle phase of nine minutes. Alternatively, a switched-mode power supply unit may be designed for a load condition of two minutes and a subsequent idle phase of eighteen minutes. In the context of such dimensioning, the structural size of the switched-mode power supply unit 2 may, under certain circumstances, be reduced further. This is promoted in that the switched-mode power supply unit 2 in the idle phases can be transferred in a controlled fashion by means of the ready signal into an idle mode in which the cooling of switched-mode power supply unit and the entire control means is improved.

The power failure detection circuit 230 is designed for respectively monitoring a line voltage at the line terminal VAC or at the input terminals 11 and, in particular, for detecting a failure of this line voltage. This monitoring or detection is realized based on a signal in the start-up circuit 224 such as, for example, a current that flows in a circuit component of the start-up circuit 224 or a voltage that is applied to a circuit component in the start-up circuit 224. The monitoring result or a detected line voltage failure is transmitted or signaled to the control segment 3. For example, the control segment 3 features a microcontroller that drives and monitors the connected motor 5. In addition to the control of the voltage delivered at the output terminals 12, a position of the motor 5 or an adjustment of the piece of furniture realized by means of the motor 5 is also monitored in the control segment 3 or the microcontroller. During a motion, for example, the absolute position is not measured in this case, but rather determined by monitoring relative motions. Accordingly, it is advantageous if the control segment 3 has exact information on the current operational data, particularly the absolute position, at any operating point.

During a line voltage failure that is detected and signaled by the power failure detection circuit 230, the control segment 3 can directly stop any motors that may be running and store the current operational data. This is possible because the switched-mode power supply unit 2 usually contains buffer capacitors that also can at least briefly make available energy for the control segment 3 in case of a line voltage failure. The stored energy can be used, in particular, in the control segment 3 for operating the microcontroller or a similar processor that usually has only a low power demand. The detection of the line voltage failure directly in the start-up circuit 224 ensures, among other things, an immediate detection of the line voltage failure such that the control segment 3 can react to the line voltage failure almost instantaneously. This ensures a safe shut-down of the system in case of a line voltage failure and, in particular, the option of restarting the system in an orderly fashion after the line voltage has been restored. In addition, the power consumption in the idle mode is reduced.

Figure 2:
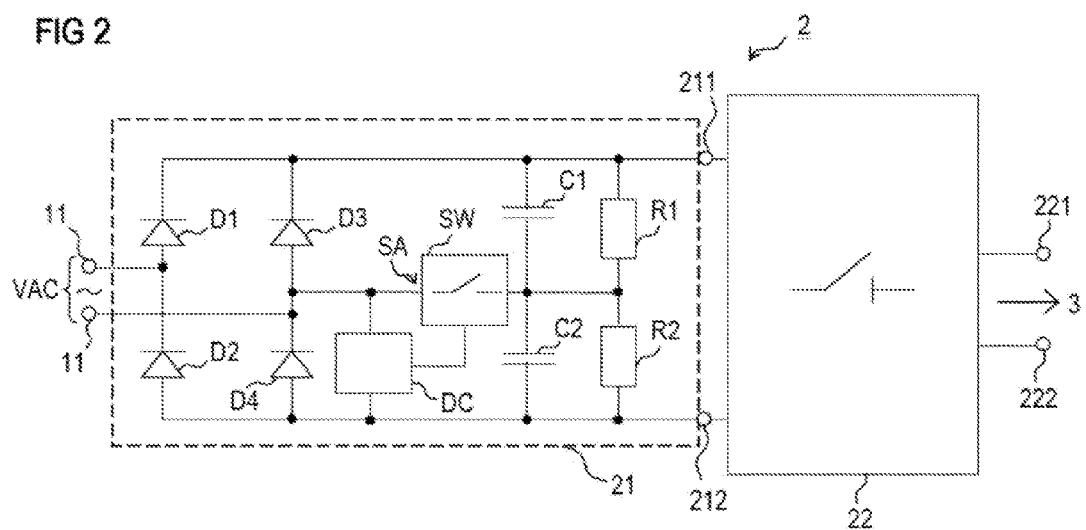
FIG. 2 shows an embodiment example of a switched-mode power supply unit for a control means.

FIG. 2 shows an embodiment example of a switched-mode power supply unit 2 that is suitable, for example, for use in a control means according to the embodiment example in FIG. 1. The switched-mode power supply unit 2 features a first stage 21 and a second stage 22. In this case, the input side of the first stage 21 is connected to the line terminal VAC and its output side is connected to the second stage 22 by means of terminals 211, 212. A terminal for an output 221, 222 of the second stage 22 is provided on the control segment 3.

The first stage 21 of the switched-mode power supply unit 2 features four rectifier diodes D1, D2, D3, D4 that are interconnected like a bridge rectifier. A series circuit of the first and the second diode D1, D2, as well as a series circuit of the third and the fourth diode D3, D4, is connected between the terminals 211, 212. Furthermore, a series circuit of a first and a second capacitor C1, C2 is connected between the terminals 211, 212. A first resistor R1 is arranged parallel to the first capacitor C1. Similarly, a second resistor R2 is provided parallel to the second capacitor C2.

The first stage 21 furthermore features a switching means SA that comprises a detection and control unit DC and a switch SW. The detection and control unit DC is connected between a junction of the third and the fourth diode D3, D4 and the second output terminal 212. The switch SW connects the junction between the third and the fourth diode D3, D4 to the junction of the first and the second capacitor C1, C2 or the first and the second resistor R1, R2. The control of the switch SW is realized by means of the detection and control unit DC.

The switch SW makes it possible to select a first or a second operating mode in the first stage 21. In the first operating mode, for example, the switch SW is in an open position such that no electrical connection exists between the junction of the capacitors C1, C2 or resistors R1, R2 and the junction of the diodes D3, D4. In this case, the circuit that forms part of the first stage 21 operates as a bridge rectifier, by means of which the A.C. line voltage applied to the input side is converted into an intermediate voltage in the form of a D.C. voltage applied to the terminals 211, 212.

In this case, the capacitors C1, C2 conventionally serve for storing electric energy and for smoothing the intermediate voltage being made available. In order to evenly distribute a voltage drop over the capacitors C1, C2, a potential equalization can be realized by means of the resistors R1, R2, wherein this approximately corresponds to a compensated capacitive voltage divider in terms of circuit technology. For this purpose, the resistors R1, R2 preferably have identical or nearly identical resistance values. In addition, the capacitance values of the capacitors C1, C2 are preferably also approximately identical. The value of the intermediate voltage at the terminals 211, 212 on the output side conventionally results from the voltage amplitude of the A.C. line voltage applied to the input side, which amounts to approximately 400 V in the European region.

In the second operating mode, the switch SW is in the closed state such that the junction of the diodes D3, D4 is electrically connected to the junction of the capacitors C1, C2 and the junction of the resistors R1, R2. This results in a respective half-wave rectification with the diodes D1, D2, during which the first and the second capacitor C1, C2 are charged to the value of the voltage amplitude of the A.C. line voltage applied to the input side. In this case, the diodes D3, D4 are operated in the inverse direction. Accordingly, the voltage amplitude applied to the input side is approximately doubled between the terminals 211, 212 by means of the capacitors C1, C2. If an effective A.C. line voltage of approximately 115 V is applied to the input side, for example, each of the capacitors C1, C2 is charged to a voltage value of approximately 200 V. Consequently, the resulting D.C. voltage between the terminals 211, 212 is an intermediate voltage of approximately 400 V. This voltage therefore essentially corresponds to the D.C. output voltage or intermediate voltage of the first stage in the first operating mode at an effective input voltage of 230 V. Consequently, an approximately identical D.C. output voltage or intermediate voltage can be made available at the terminals 211, 212 for different voltage values of A.C. input voltages.

In this embodiment example, the detection and control unit DC is designed for evaluating a voltage value at the junction of the third and the fourth diode D3, D4 and for thus detecting a voltage range in which the A.C. line voltage applied to the input side lies. A voltage value at the junction of the first and the second diode D1, D2 can be alternatively or additionally evaluated. The switch SW can be transferred into an open or into a closed state in a controlled fashion in dependence on this detection such that the circuit is operated in the first or in the second operating mode. For example, the decision whether the circuit is operated in the first or in the second operating mode is made based on a threshold value or reference value that is respectively exceeded or not reached by the line voltage.

The intermediate voltage made available by the first stage 21 is converted into the voltage at the terminals 221, 222 required by the control segment 3 in the second stage 22 during the switched-mode operation that is expressed with the switch symbol of the second stage 22.

Figure 3:
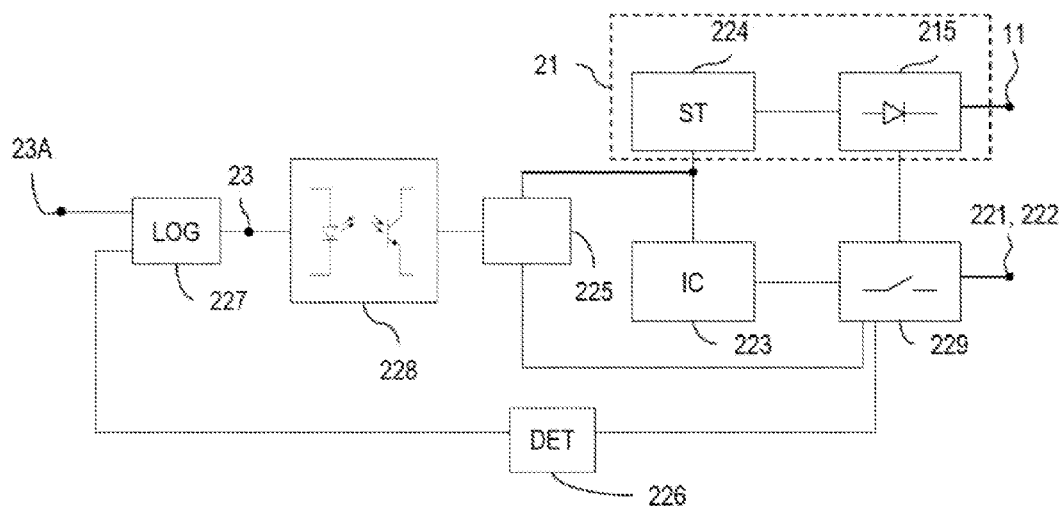
FIG. 3 shows a first design detail of a switched-mode power supply unit.

FIG. 3 shows a design detail of an example of a switched-mode power supply unit. The block diagram according to FIG. 3 shows an optocoupler 228, the input side of which is connected to the control input 23 and a detection circuit 226 by means of a logic element 227 and the output side of which is connected to an operational supply circuit 225, the switching regulator component 223 and the first stage 21 that comprises the start-up circuit 224 and a rectifier block 215. The input side of the start-up circuit 224 is connected to terminals of the rectifier block 215 of the first stage 21 that is electrically coupled to a line terminal 11 for supplying the A.C. line voltage as described above. A supply voltage with low power is made available for the switching regulator component 223 with the aid of the start-up circuit 224. In other respects, the component 223 is supplied with a voltage that is derived from an auxiliary voltage in the switching means 229 by the operational supply circuit 225, wherein the power supply by means of the operational supply circuit can be connected or disconnected in dependence on an activation by the optocoupler 228.

In the regular mode, i.e., a normal operating mode or power mode, the operational supply circuit 225 is driven in such a way that a permanent power supply of the component 223 is realized. In this operating mode, the component 223 drives the switching means 229 such that it generates, among other things, a D.C. voltage at the terminals 221, 222 from the intermediate voltage made available by the first stage 21. A power supply of the component 223 by the start-up circuit 224 is not required in this operating mode.

When the switched-mode power supply unit should be transferred into an idle mode in a controlled fashion by a corresponding signal such as, for example, the ready signal at the input 23, the operational supply circuit 225 is driven in such a way that the component 223 is not permanently supplied with power, but rather obtains its energy from the start-up circuit 224. In this operating mode, the switching means 229 can only be driven over a limited time period because the energy made available by the start-up circuit 224 does not suffice for a permanent switched-mode operation of the component 223. This applies accordingly, for example, when an excessive voltage is detected in the switching means 229 by the detection circuit 226.

For example, the operational supply circuit 225 is driven by means of the logic element 227, the terminal 23 and the optocoupler 228 when the ready signal is received at the input 23A and/or generated by the detection circuit 226 in case an overvoltage is detected in the switching means 229. The ready signal for the controlled transfer into the idle mode can be generated by the control segment 3, for example, in an idle phase. Due to the limited time period of the power supply by means of the start-up circuit 224, the component 223 in other words operates in a clocked fashion in the idle mode. This clocked operation is realized with the aid of the start-up circuit 224 that briefly starts up and shortly thereafter stops the component 223 again if or because the component 223 is not supplied with power by means of the operational supply circuit 225. The component 223 therefore is periodically initialized and switched off again.

In contrast to a no-load operation in the power mode, in which merely no power is taken off by the D.C. voltage delivered on the output side, but power dissipation still occurs due to switching processes, the power consumption of the circuit arrangement is significantly reduced during a no-load operation in the idle mode because the aforementioned switching losses do not occur. During the idle mode, the switched-mode power supply unit in fact delivers a voltage that, under certain circumstances, also suffices for supplying power to electronics of the connected control segment, but not its power section. In order to resume the normal operating mode or power mode, it is necessary to once again activate the switched-mode power supply unit 2 accordingly.

The described idle mode therefore makes it possible to reduce the power demand of the switched-mode power supply unit in such a way that, for example, certain statutory environmental standards such as, for example, Green Label, are fulfilled.

Figure 4:
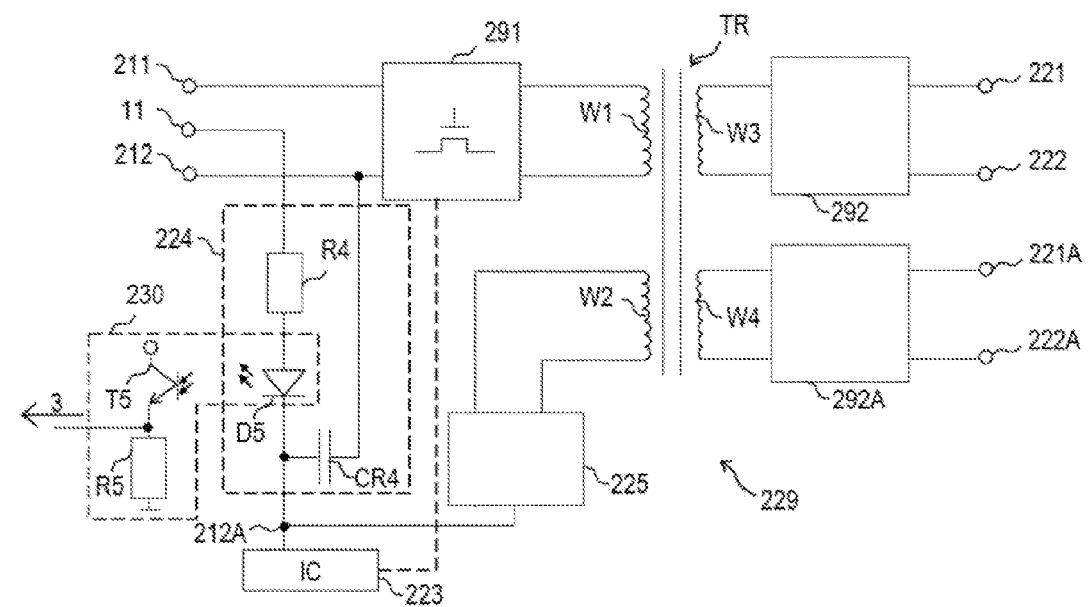
FIG. 4 shows a second design detail of a switched-mode power supply unit.

FIG. 4 shows another design detail of a switched-mode power supply unit. The block diagram in FIG. 4 shows a switching transistor block 291, the input side of which is connected to the terminals 211, 212 and the output side of which is connected to a first winding W1 of a transformer TR, the start-up circuit 224, the switching regulator component 223, the operational supply circuit 225 and the circuit blocks 292, 292a. On its input side, the operational supply circuit 225 is connected to windings W2 of the transformer TR. The windings W1, W2 represent a primary side of the transformer TR whereas the windings W3, W4 are arranged on the secondary side and connected to the circuit blocks 292, 292a. An output of the operational supply circuit 225 is coupled to the terminal 212A that is connected to a supply voltage input of the component 223. The transistor switch in the block 291 is driven by the switching regulator component 223. With reference to FIG. 3, the transformer TR and the circuit elements 291, 292, 292a form part of the switching means 229.

Furthermore, the start-up circuit 224 is connected to the terminal 212A. This start-up circuit comprises a resistor R4 that is connected in series to a light-emitting diode D5 between one of the line voltage terminals 11 and the terminal 212A. The start-up circuit 224 furthermore comprises an energy storage in the form of a capacitor CR4 that connects the terminal 212 to the terminal 212A. The light-emitting diode D5 forms part of the power failure detection circuit 230 that also features a phototransistor T5 with a series-connected resistor R5. The light-emitting diode D5 and the phototransistor T5 cooperate in accordance with the principle of an optocoupler. An optical connection between the light-emitting diode D5 and the phototransistor T5 can be realized due to the immediate vicinity of the two elements. Alternatively, it would also be possible to provide an optical waveguide between the elements such that the phototransistor T5 and the resistor R5 can also be positioned at a different location of the control means, for example in the control segment 3. In any case, a junction between the transistor T5 and the resistor R5 is connected to the control segment 3 in order to signal a corresponding monitoring result or detection result of the power failure detection circuit 230 to the control segment.

In the idle mode, the capacitor CR4 is charged with a current that is directly obtained from the line voltage by means of the resistor R4. Due to the connection of the start-up circuit 224 to the terminals 11 and 212, for example, one of the diodes D2, D4 of the rectifier is used for a half-wave rectification in the first stage 21 that, among other things, delivers the charging current. This charging current simultaneously serves for operating the light-emitting diode D5. When the line voltage is available, the light-emitting diode D5 emits radiation that is picked up by the phototransistor T5 in order to deliver a corresponding signal to the control segment 3. When the line voltage fails, no current flows through the resistor R4 or the light-emitting diode D5. The phototransistor T5 accordingly no longer detects any radiation, wherein this is signaled to the control segment 3 in the form of a line voltage failure. Consequently, a direct and fast detection of a line voltage failure is ensured. Furthermore, no additional current is required for the light-emitting diode D5 because the charging current for the capacitor CR4 is directly utilized for monitoring the line voltage.

Once a certain voltage value is reached in the capacitor CR4 due to the charging with the current flowing through the resistor R4 or the light-emitting diode D5, the switching regulator component 223 begins to initialize itself in order to realize a switched-mode operation or to drive the transistor switch in the switching transistor block 291. However, the power demand of the component 223 is higher than the charging current flowing through the resistor R4 such that the capacitor CR4 is discharged. If no additional voltage is supplied by means of the operational supply circuit 225, the component 223 is accordingly stopped again and the capacitor CR4 is recharged. The operational supply circuit 225 is once again driven, for example, by an optocoupler 228 that is not illustrated in this figure in order to provide a better overview and can transmit a ready signal. This results in the capacitor CR4 being periodically charged and discharged or in a periodic operation of the component 223 in the idle mode.

However, when the operational supply circuit 225 is switched into the normal operating mode, initial switching processes in the switching transistor block 291 cause a current in the winding W1 and a voltage is induced in the winding W2 that serves as an auxiliary voltage for the operational supply circuit 225 and from which the supply voltage at the terminal 212A can be derived. This voltage suffices for a continuous operation of the component 223 and therefore of the switched-mode power supply unit. On the secondary side, voltages are accordingly induced in the windings W3, W4 and respectively converted into the D.C. voltage at the terminals 221, 222 and an additional D.C. voltage at the terminals 221a, 222a by the circuit components 292, 292a.

Figure 5:
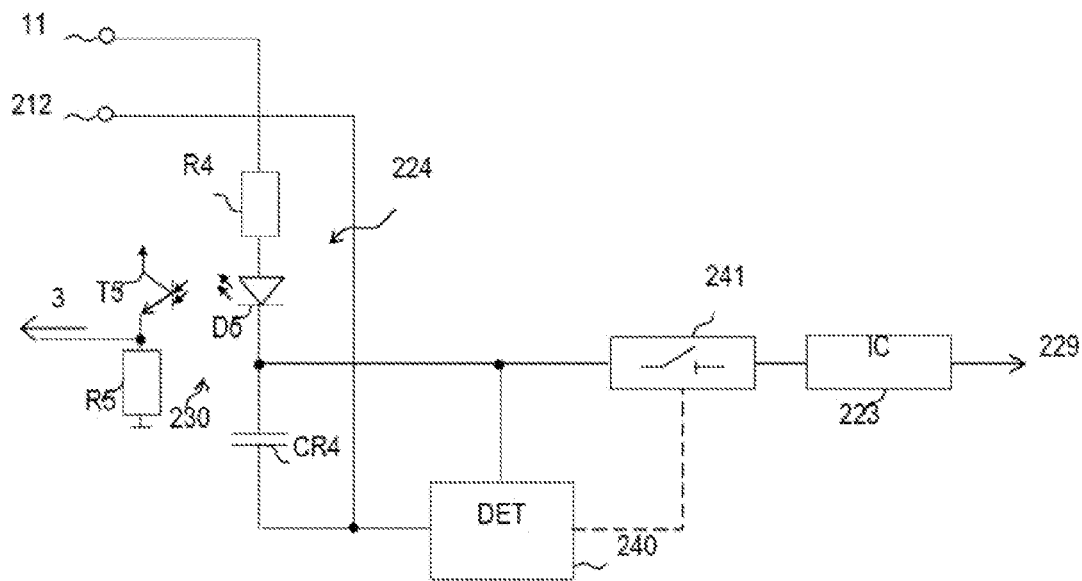
FIG. 5 shows a third design detail of a switched-mode power supply unit.

FIG. 5 shows another design detail of an example of a switched-mode power supply unit that represents, in particular, a detail of the embodiment illustrated in FIG. 4. The block diagram in FIG. 5 particularly shows the start-up circuit 224 with the resistor R4, the capacitor CR4 and the light-emitting diode D5 or the power failure detection circuit 230. Furthermore, a detection circuit 240 is provided, the input side of which is connected to the two terminals of the capacitor CR4 in order to measure a voltage across the capacitor CR4. On its output side, the detection circuit 240 is connected to a switching unit 241 that couples the output of the start-up circuit 224 at the junction between the capacitor CR4 and the light-emitting diode D5 to the switching regulator component 223 in order to drive this switching unit. The operational supply circuit 225 and other elements are not illustrated in FIG. 5 in order to provide a better overview. An output of the switching regulator component 223 is coupled to the switching means 229 analogously to the embodiment illustrated in FIG. 3.

For example, the switching regulator component 223 requires a certain threshold voltage in order to actively operate. Although parasitic currents flow when a voltage that is lower than this threshold voltage is applied to a supply terminal of the switching regulator component 223, these parasitic currents merely lead to energy losses and heating of the circuit. The detection circuit 240 accordingly monitors whether the voltage across the capacitor CR4 exceeds a certain threshold value that is sufficient for an active operation of the switching regulator component 223. In this case, the switching unit 241 establishes a corresponding connection between the start-up circuit 224 and the switching regulator component 223. When the voltage at the capacitor CR4 drops again due to the operation of the switching regulator component 223 that is supplied with power by the start-up circuit 224, this can also be detected by the detection circuit 240 in order to correspondingly separate the connection by means of the switching unit 241.

Figure 6:
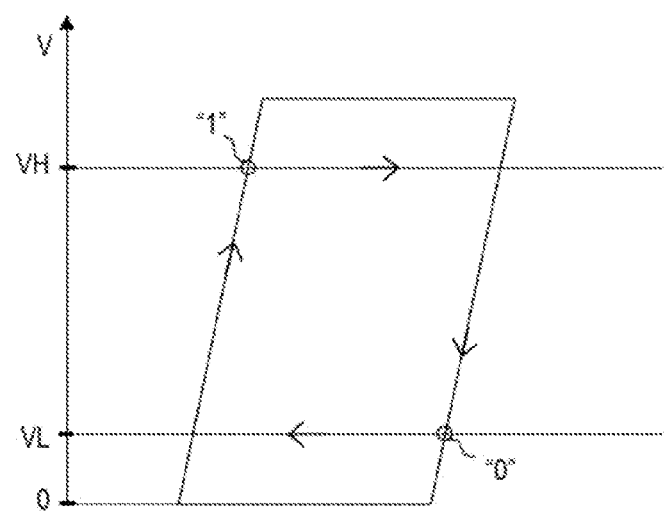
FIG. 6 shows a signal diagram of a voltage comparison.

The connecting and separating may take place, for example, with a hysteresis. FIG. 6 shows an example signal diagram with a first threshold value VH and a second threshold value VL referred to as voltage V applied to the capacitor CR4. When the voltage V increases and exceeds the first threshold value VH that is higher than the second threshold value VL, the switching unit 241 is closed as indicated by the switching status "1." When the voltage V across the capacitor CR4 drops again and falls short of the lower threshold value VL, the switching unit 241 is opened as indicated by the switching status "0." For example, the threshold voltage above which the switching regulator component 223 can be actively operated lies between the first and the second threshold value VH, VL.

The illustrated embodiments make it possible to realize a control means with low power consumption. In addition, an increased operational reliability of the control means is achieved due to the described power failure detection. The arrangement of the power failure detection in the start-up circuit results in a reduced power consumption of the control means, particularly in a stand-by mode or idle mode.

The invention claimed is:

1. A control means, comprising
a control segment (3) that is designed for driving an electrically adjustable piece of furniture; and
a switched-mode power supply unit (2) that supplies power to the control segment (3), wherein said switched-mode power supply unit features a switching regulator component (223) for controlling the switched-mode power supply unit (2) and can be switched into a normal operating mode and into an idle mode;
wherein the switched-mode power supply unit (2) is designed for making available a supply voltage for the switching regulator component (223) in a clocked fashion with the aid of a start-up circuit (224) in the idle mode;
wherein the switched-mode power supply unit (2) features a power failure detection circuit (230) that is designed for detecting a failure of a line voltage applied to the input side of the switched-mode power supply unit (2) based on a signal within the start-up circuit (224) and for signaling this failure to the control segment (3);
wherein the start-up circuit (224) comprises an energy storage (CR4), a resistor element (R4) and a detection element (D5) that is connected in series to the resistor element (R4) and forms part of the power failure detection circuit (230);
wherein the start-up circuit (224) comprises a detection circuit (240) that is designed for controlling a connection between the start-up circuit (224) and the switching regulator component (223) based on a voltage across the energy storage (CR4); and
wherein the detection circuit (240) is designed for establishing the connection between the start-up circuit (224) and the switching regulator component (223) when the voltage across the energy storage (CR4) exceeds a first threshold value (VH) and for separating the connection between the start-up circuit (224) and the switching regulator component (223) when the voltage across the energy storage (CR4) falls short of a second threshold value (VL).

2. The control means according to claim 1, in which the detection element (D5) comprises a light-emitting diode that forms part of an optocoupler (D5, T5), wherein said optocoupler couples the power failure detection circuit (230) to the control segment (3).

3. The control means according to claim 1, in which the energy storage (CR4) and the resistor element (R4) are dimensioned such that a time period for charging the energy storage (CR4) is longer in the idle mode than a time period for discharging the energy storage (CR4) by the switching regulator component (223).

4. The control means according to one of claim 1, 2 or 3, in which the switched-mode power supply unit (2) features a first and a second stage (21, 22), wherein
the first stage (21) is designed for generating an intermediate voltage from the line voltage;
the second stage (22) comprises the switching regulator component (223) and is designed for generating the D.C. voltage from the intermediate voltage by means of the switching regulator component (223) during the switched-mode operation; and
the start-up circuit (224) is designed for deriving the supply voltage for the switching regulator component (223) from the line voltage.

5. The control means according to claim 4, in which the switched-mode power supply unit (2) is designed for permanently making available a supply voltage for the switching regulator component (223) in the normal operating mode by means of an operational supply circuit (225) that is designed for deriving the supply voltage for the switching regulator component (223) from an auxiliary voltage in the second stage (22).

6. The control means according to one of claim 1, 2 or 3, in which the control segment (3) is designed for stopping motors (5) of the electrically adjustable piece of furniture and for storing current operational data, particularly one or more motor positions, when a failure of the line voltage is signaled by the power failure detection circuit (230).

7. The control means according to one of claim 1, 2 or 3, in which the switched-mode power supply unit (2) is designed for delivering a D.C. voltage that is fed to the control segment (3) in order to generate at least one output voltage of the control means.

8. The control means according to claim 1, wherein the connection between the start-up circuit (224) and the switching regulator component (223) is formed by a switching unit (241) that is controlled by the detection circuit (240).

9. The control means according to claim 1, wherein the first threshold value is higher than the second threshold value such that a hysteresis is formed between establishing and separating the connection between the start-up circuit (224) and the switching regulator component (223).

\* \* \* \* \*